C. D. KNOWLTON.
METHOD OF MAKING CUTTERS.
APPLICATION FILED MAR. 22, 1919.
1,376,551. Patented May 3, 1921.
Fig. 1.
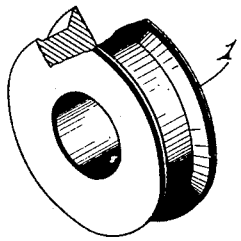
Fig. 3.
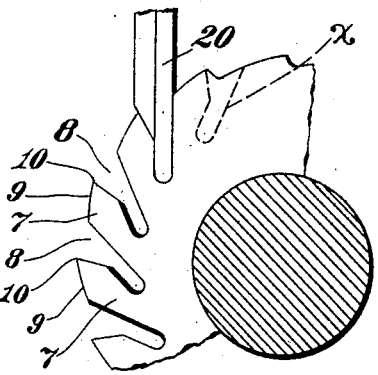
Fig. 2.
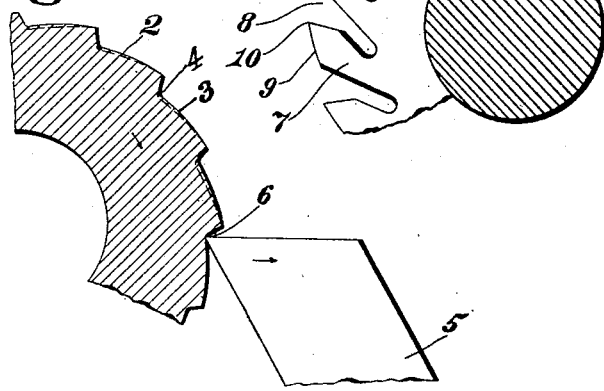
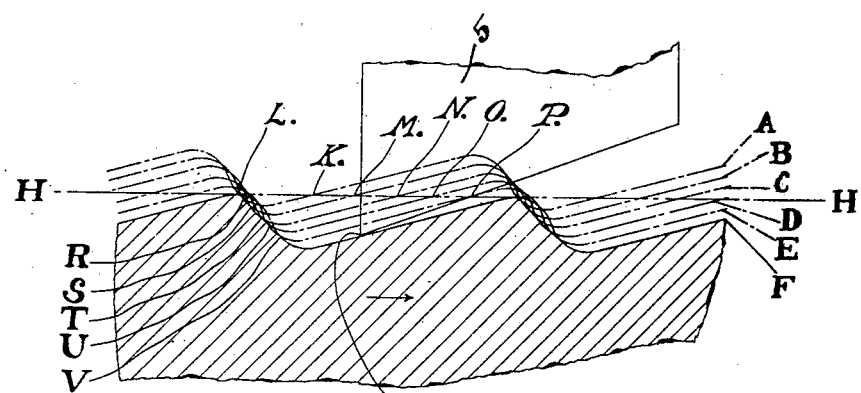
Fig. 4.
INVENTOR
Cutler D. Knowlton
By his Attorney
Nelson W. Howard

UNITED STATES PATENT OFFICE.

CUTLER D. KNOWLTON, OF ROCKPORT, MASSACHUSETTS, ASSIGNOR TO UNITED SHOE MACHINERY CORPORATION, OF PATERSON, NEW JERSEY, A CORPORATION OF NEW JERSEY.

METHOD OF MAKING CUTTERS.

1,376,551.     Specification of Letters Patent.     Patented May 3, 1921.

Application filed March 22, 1919. Serial No. 284,277.

*To all whom it may concern:*

Be it known that I, CUTLER D. KNOWLTON, a citizen of the United States, residing at Rockport, in the county of Essex and State of Massachusetts, have invented certain Improvements in Methods of Making Cutters, of which the following description, in connection with the accompanying drawings, is a specification, like reference characters on the drawings indicating like parts in the several figures.

This invention pertains to a new and improved method of making cutters and will be described, by way of example, in its application to the production of cutters such as are used in carrying out certain of the operations involved in the manufacture of shoes.

Heretofore, such cutters, for example, those for trimming the forepart of a shoe, have been formed from blanks severed from bar stock and rough turned either by the machine by which they were severed from the stock or by a separate machine to the general contour of the cutter and have then been "gashed" or grooved at spaced intervals transversely of their peripheries to form teeth having their outer surfaces disposed concentrically of the axis of the blank. To the end of providing clearance between the teeth and the work rearwardly of the cutting edges of the teeth, it has been customary to "back off" the outer surfaces of the teeth or, in other words, to remove a portion of each tooth rearwardly of its cutting edge so as to cause the surface of the tooth to recede inwardly from the cutting edge. The operation of the backing off tool entails a considerable stress on the teeth with the result frequently of springing or bending them so that they are not uniformly disposed relatively to the body of the cutter or of weakening them at their reduced portions where they are joined to the body of the cutter.

An object of this invention is to devise a method of making cutters which will produce cutters of uniform construction, which will not weaken any part of the cutters, and which can, moreover, be practised more economically than can former methods.

To this end the invention in one of its aspects resides in providing for the recession of the teeth of the cutter by backing off portions of the blank from which the cutter is made and then forming teeth on the blank including the backed off portions of the blank. The teeth of the blank are, accordingly, formed with surfaces receding inwardly from their cutting edges. From the foregoing, it will be understood that the ultimate effect of the improved method is to form cutters with teeth having substantially the same characteristics as those of cutters produced by known methods involving the backing off of the teeth subsequently to their formation on the blank.

In accordance with another important characteristic of the invention, the backing off operation consists in removing spaced portions of the blank so as to form depressions in the blank and then deepening the depressions by operation on the blank forwardly of the rear ends of the depressions and without removing the material of the blank at the rear of the depressions. In making a cutter having its teeth formed on its periphery, for example, a forepart cutter, a series of depressions is formed in the periphery of the blank preferably by moving a cutting tool in and out relatively to the periphery of the blank during movement of the blank, progressively advancing the path of movement of the cutting tool inwardly of the blank so as gradually to deepen the depressions in the blank, and withdrawing the cutting tool from the blank during each cycle of movement of the blank at a point in advance of that at which the tool was withdrawn from the blank on the preceding cycle of its movement so as to cause the edge of the cutting tool to clear the blank at the rear of the depression formed by the preceding cuts. The cutter is preferably moved inwardly at a relatively slow rate of speed and outwardly at a relatively rapid rate of speed so as to form shoulders on the blank at the rear of the depressions, and the withdrawal of the cutting tool at progressively advanced points of the periphery of the blank so as to clear said shoulders is effected by changing the timing of the movement of the blank and cutting tool.

Although the invention is described herein in its application to the making of cutters of the type employed for trimming the forepart of a shoe and having their teeth disposed peripherally of the bodies of the cutters, it is recognized that its use is not limited thereto and that it may be utilized in the production of cutters of other types including those employed for performing other operations on shoes. Accordingly, the scope of the invention is intended to be limited only as required by the appended claims.

Other objects and features of the invention will appear as the description proceeds and will be pointed out in the appended claims.

In the drawings,

Figure 1 exhibits a cutter blank which has been rough turned into the general shape of a cutter;

Fig. 2 shows the blank after the formation of depressions in its periphery and a cutting tool operating to form the depressions in the blank;

Fig. 3 illustrates the manner of forming the teeth on the blank; and

Fig. 4 is a diagrammatic view indicating the manner of operation of the cutting tool in forming the depressions in the blank.

The blank 1 from which the finished cutter is produced is customarily severed from a bar of substantially uniform diameter and then turned down to the general contour of the cutter as indicated in Fig. 1.

The operation of backing off the blank preferably consists in forming a series of depressions 2 about the periphery of the blank, each of which presents a relatively long surface 3 inclined gradually inwardly toward the axis of the blank and a shorter surface constituting a shoulder 4 on the blank and abruptly inclined outwardly to the periphery of the blank from the point of greatest depression of the surface 3.

The manner of operation of the cutting tool 5 in forming the depressions 2 in the blank 1 will be understood by reference to Fig. 4 in which the broken lines A, B, C, D, E represent the path of movement of the cutting tool relatively to the blank 1 upon successive cycles of rotation of the blank. The line H—H indicates the periphery of the blank developed along a straight line. The blank may be rotated by any suitable means as, for example, by being mounted on an arbor to present adjacent portions of the periphery of the blank successively to the cutting tool 5 which is moved in and out relatively to the periphery of the blank. Referring to Fig. 4, it will be seen that upon the first cycle of rotation of the blank 1, the edge 6 of the cutting tool 5 will engage the periphery of the blank 1 at the point K and will be withdrawn from the blank at the point L. The path of movement of the cutting tool is gradually shifted inwardly or, in other words, the edge of the tool is caused to approach more nearly to the axis of the blank. The tool is thereby caused to engage the periphery of the blank upon each cycle of rotation of the blank at a point in advance of that at which the blank was engaged by the cutting tool in its preceding cycle of rotation and would normally, that is, if the timing of the rotation of the blank and the reciprocation of the cutting tool remained unchanged, be withdrawn from the blank rearwardly of the point at which it was withdrawn in the preceding cycle of rotation of the blank, since the farther the cutter penetrates into the blank, the longer it will take to withdraw it therefrom, and the blank is itself being constantly rotated. It is evident, however, from an examination of the path of movement of the edge 6 of the cutting tool 5 from the point K on the blank 1 to the point L, as indicated by the line A, that the cutting tool has imparted thereto a relatively slow inward movement and a relatively rapid outward movement making a shoulder on the blank contiguous to the point L. Consequently, if the cutting tool 5 were not withdrawn on the second cycle of rotation of the blank until after the edge 6 of the tool had passed the point L, the tool would be required to cut through the shoulder at that point, thus imposing an excessive strain on the tool. Analogously, upon each of the successive rotations of the blank, the cutting tool would remove the shoulder formed during the preceding cycle of rotation of the blank. Manifestly, the strain on the cutting tool would be increased as it was progressively moved deeper into the blank and the stress imposed upon it in making the final cuts would be very likely to break the tool.

To the end that all possible strain on the cutting tool may be eliminated, the invention aims to effect the withdrawal of the edge 6 of the cutting tool from the blank in such a manner that it will not engage the shoulder formed by a preceding cut. In the present exemplification of the invention, this is effected by retarding the timing of the rotation of the blank relatively to the in and out reciprocations of the cutting tool 5 so that upon successive rotations of the blank the edge of the cutting tool is withdrawn therefrom at points sufficiently in advance of those at which the cutting tool was withdrawn upon preceding cycles of rotation of the blank as to enable the edge of the cutting tool to clear the shoulders of the blank. The edge 6 of the cutting tool 5 successively engages the periphery of the blank at points indicated on Fig. 4, by the letters M, N, O, P respectively at the junctions of the broken lines B, C, D and E with the line H—H, and leaves the blank at points designated R, S, T, and U. On its final cut indicated by the line F, Fig. 4, the edge of the cutter leaves the blank at the point V. The curved lines above the points R, S, T, U and V represent the paths of movement of the cutter in clearing the shoulder of the blank. The broken lines, Fig. 2, indicate the lines of the final cuts of the tool 5.

I contemplate effecting the change of timing of the rotation of the blank and the reciprocations of the cutting tool automatically in the commercial practice of the invention, and although, as above stated, I prefer to effect such change by retarding the timing of the rotation of the blank it is recognized that the desired result may be achieved in other ways, such as, for example, changing the timing of the reciprocations of the cutting tool.

After the formation of the depressions 2 in the blank 1, it is subjected to the operation of the usual gashing tool 20 which removes portions of the blank to form teeth 7, separated by transverse grooves or recesses 8. As will clearly appear from Fig. 3, in which the broken line X indicates the line of cut of the gashing tool, the portions of the blank removed by the gashing tool include the shoulders 4 formed on the blank by the cutting tool 5, from which it results that the outer surfaces 9 of the teeth 7 of the blank are constituted by the gradually inclined surfaces 3. Consequently, the teeth include the portions of the blank which have been backed off by the formation of the inclined surfaces 3. The gashing tool is constructed so as to form relatively sharp cutting edges 10 on the forward sides of the teeth 7 from which their outer surfaces 9 gradually recede inwardly of the blank. The blank 1 is preferably rotated transversely of the plane of operation of the gashing tool 20 to present the shouldered portions of the blank successively in operative relation thereto.

Although I prefer at the present time in making cutters of the type illustrated in the drawings to sever the blank from the stock and to turn it down to the general contour of the cutter prior to the backing off operation, such operation may be performed before severing the blank from the stock and, for example, while the stock is held rigidly in a chuck without departing from the principles of the invention. Moreover, the invention contemplates that the shaping of the blank to the contour of the cutter and the backing off of the blank may be effected in a single operation instead of in separate operations as hereinbefore described.

Having thus described my invention, what I claim as new and desire to secure by Letters Patent of the United States is:—

1. The method of making cutters which comprises cutting out portions of a blank to form backed off portions and then forming teeth on the blank including the backed off portions of the blank.

2. The method of making cutters which comprises cutting a series of inclined surfaces on a blank and then removing portions of the blank between said surfaces to form teeth on the blank the outer surfaces of which are constituted by said inclined surfaces.

3. The method of making cutters which consists in cutting out portions of a blank to form inclines terminating in relatively abrupt shoulders and then removing portions of the blank between said inclines and including said shoulders thereby to form teeth on the blank comprising the inclined portions of the blank.

4. The method of making cutters which consists in cutting a series of inclined surfaces on a blank terminating in relatively abrupt shoulders and then removing the shouldered portions of the blank to form teeth on the blank the outer surfaces of which are constituted by said inclined surfaces.

5. The method of making cutters which consists in cutting similarly inclined surfaces on a blank spaced from each other by relatively abrupt shoulders and then removing the shouldered portions of the blank to form teeth on the blank the outer surfaces of the teeth being determined by said inclined surfaces.

6. The method of making cutters which consists in cutting out portions of the periphery of a blank to form backed off portions and then forming teeth on the blank including the backed off portions of the blank.

7. The method of making cutters which consists in cutting a series of receding surfaces on the periphery of a blank and then removing portions of the blank between said surfaces to form teeth on the blank the outer surfaces of which are constituted by said inclined surfaces.

8. The method of making cutters which consists in cutting a blank to form a series of homogeneous surfaces receding inwardly from the periphery of the blank and extending transversely of the blank and then removing portions of the blank between said surfaces to form teeth on the blank.

9. The method of making cutters which comprises shaping a blank to the general contour of a cutter, cutting depressions in the periphery of the blank to form surfaces receding inwardly from the periphery of the blank, and then grooving the blank transversely by removing portions of the blank between said receding surfaces thereby to form teeth on the blank having their outer surfaces receding from their edges.

10. The method of making cutters which consists in cutting a blank to form a series of surfaces receding inwardly from the periphery of the blank and terminating in relatively abrupt shoulders and then removing portions of the blank between said surfaces and including said shoulders to form teeth on the blank having their outer surfaces receding from their edges.

11. The method of making cutters which comprises shaping a blank to the general contour of a cutter, cutting out portions in the periphery of the blank to form surfaces disposed transversely of the blank and receding gradually inwardly from the periphery of the blank, said cut out portions terminating in relatively abrupt shoulders between said surfaces, and then removing portions of the blank inclusive of said shoulders thereby to form teeth on the blank having their outer surfaces receding inwardly from their edges.

12. The method of making cutters which consists in successively removing portions of a blank at spaced points on the blank to form a series of surfaces inclined inwardly of the blank and then removing portions of the blank between said inclined surfaces to form teeth on the blank having their outer surfaces constituted by said inclined surfaces.

13. The method of making cutters which comprises shaping a blank to the general contour of a cutter, successively removing portions of the blank at spaced points of the periphery of the blank so as to form depressions in the blank having homogeneous surfaces receding from its periphery, and then grooving the blank transversely between said surfaces thereby to form teeth on the blank having their outer surfaces receding from their edges.

14. The method of making cutters which comprises shaping a blank to the general contour of a cutter, cutting out a series of surfaces on the periphery of the blank inclined inwardly of the blank, and then removing portions of the blank between said inclined surfaces to form teeth on the blank having their outer surfaces constituted by said inclined surfaces.

15. The method of making cutters which comprises removing spaced portions of a blank so as to form depressions in the blank and then deepening the depressions by operation on the blank forwardly of the rear of the depressions and without removing the material of the blank at the rear of the depressions.

16. The method of making cutters which comprises shaping a blank to the general contour of a cutter, removing spaced portions of the periphery of the blank so as to form depressions in its periphery, and then deepening the depressions without removing the material of the blank at the rear of the depressions.

17. The method of making cutters which consists in removing spaced portions of the periphery of a blank to form depressions in its periphery having relatively abrupt shoulders at their rear ends, and then deepening the depressions by successive removals of portions of the blank without removing the material composing the shoulders at the rear of the depressions.

18. The method of making cutters which comprises forming spaced depressions in the surface of a blank by relative in and out movement of the blank and a cutting tool and by another movement of the blank and tool to present different points of the blank successively in operative relation to the tool, progressively advancing the inward limit of movement of the cutting tool inwardly of the blank so as gradually to deepen the depressions of the blank, and withdrawing the cutting tool from the blank after each operation in a depression of the blank at a point in advance of that at which the tool was withdrawn from the blank on the preceding operation in said depression.

19. The method of making cutters which comprises forming spaced depressions in the periphery of a blank by moving a cutting tool in and out relatively to the periphery of the blank during movement of the blank, progressively advancing the path of movement of the cutting tool inwardly of the blank so as gradually to deepen the depressions in the blank, and withdrawing the cutting tool from the blank during each cycle of movement of the blank at a point in advance of that at which the tool was withdrawn from the blank on the preceding cycle of its movement.

20. The method of making cutters which comprises shaping a blank to the general contour of a cutter, and then forming spaced depressions in the periphery of the blank having surfaces inclined inwardly of the blank and terminating in relatively abrupt shoulders by moving a cutting tool inwardly toward the axis of the blank at a relatively slow speed and outwardly at a relatively rapid speed during movement of the blank, progressively advancing the path of movement of the cutting tool inwardly of the blank so as gradually to deepen the depressions in the blank, and withdrawing the cutting tool from the blank during each cycle of movement of the blank at a point in advance of that at which the tool was withdrawn from the blank at the preceding cycle of its movement so as to clear the shoulders formed on the blank during preceding cycles.

21. The method of making cutters which comprises forming spaced depressions in the periphery of a blank having surfaces inclined inwardly of the blank and terminating in relatively abrupt shoulders extending outwardly to the periphery of the blank by rotating the blank and moving a cutting tool inwardly toward the axis of the blank at a relatively slow speed and outwardly at a relatively rapid speed, progressively advancing the path of movement of the cutting tool inwardly after each cycle of rotations of the blank so as gradually to deepen the depressions in the blank, and withdrawing the cutting tool from the blank during the respective cycles of rotation of the blank at points in advance of those at which the tool was withdrawn from the blank during preceding cycles of its rotation so as to clear the shoulders formed on the blank during preceding cycles.

22. The method of making cutters which comprises forming spaced depressions in the periphery of the blank having surfaces inclined inwardly of the blank and terminating in relatively abrupt shoulders extending outwardly to the periphery of the blank by moving the blank and moving a cutting tool inwardly toward the axis of the blank at a relatively slow rate of speed and outwardly at a relatively rapid rate of speed, progressively advancing the path of movement of the cutting tool inwardly after each cycle of movement of the blank so as gradually to deepen the depressions in the blank, and changing the timing of the movements of the blank and cutting tool so as to cause the tool to be withdrawn from the blank during each cycle of its movement at a point in advance of that at which it was withdrawn from the blank during the preceding cycle of movement of the blank so as to clear the shoulders formed on the blank during preceding cycles.

23. The method of making cutters which comprises the progressive removal of portions spaced around the periphery of a blank to form small depressions, and then deepening the depressions progressively without removing the material of the blank at the rear of the depressions.

24. The method of making cutters which comprises the progressive removal of portions spaced around the periphery of a blank to form depressions having inclined surfaces, then deepening the depressions progressively, and then removing portions of the blank intermediate said surfaces to form teeth on the blank, the outer surfaces of the teeth being constituted by said inclined surfaces.

In testimony whereof I have signed my name to this specification.

CUTLER D. KNOWLTON.